(12) United States Patent
Maguin et al.

(10) Patent No.: US 9,784,158 B2
(45) Date of Patent: Oct. 10, 2017

(54) DEVICE FOR PROVIDING A LIQUID ADDITIVE

(71) Applicant: CONTINENTAL AUTOMOTIVE GMBH, Hannover (DE)

(72) Inventors: Georges Maguin, Marly (FR); Philippe Mertes, Faulquemont (FR); Cheikh Diouf, Silly-sur Nied (FR); Finn Frederiksen, Hals (DK); Sven Schepers, Troisdorf (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/435,220

(22) PCT Filed: Oct. 10, 2013

(86) PCT No.: PCT/EP2013/071133
§ 371 (c)(1),
(2) Date: Apr. 13, 2015

(87) PCT Pub. No.: WO2014/057021
PCT Pub. Date: Apr. 17, 2014

(65) Prior Publication Data
US 2015/0292382 A1    Oct. 15, 2015

(30) Foreign Application Priority Data
Oct. 11, 2012  (DE) .................. 10 2012 109 675

(51) Int. Cl.
*F01N 3/00* (2006.01)
*F01N 3/10* (2006.01)
*F01N 3/20* (2006.01)

(52) U.S. Cl.
CPC ............. *F01N 3/206* (2013.01); *F01N 3/208* (2013.01); *F01N 3/2066* (2013.01);
(Continued)

(58) Field of Classification Search
CPC ............. F01N 2610/02; F01N 2610/10; F01N 2610/1406; F01N 3/208; F01N 3/2066; F01N 3/206; Y02T 10/24
See application file for complete search history.

(56) References Cited

U.S. PATENT DOCUMENTS 8,301,020 B2    10/2012  Wildegger
8,459,013 B2 *  6/2013   Hosaka ................. F01N 3/2066
                                                    220/562

(Continued)

FOREIGN PATENT DOCUMENTS

CN    101680343 A    3/2010
CN    202036861 U    11/2011
(Continued)

*Primary Examiner* — Phutthiwat Wongwian
*Assistant Examiner* — Diem Tran
(74) *Attorney, Agent, or Firm* — Laurence A. Greenberg; Werner H. Stemer; Ralph E. Locher

(57) ABSTRACT

A device for providing a liquid additive includes an assembly main body on which at least one hydraulic component is mounted for the operation of the device. A plug-in plate is fastened to the assembly main body and at least one electric heater and at least one further electrical component for the operation of the device are mounted on the plug-in plate. The at least one electric heater extends from the plug-in plate into at least one cutout of the assembly main body. A motor vehicle having the device is also provided.

12 Claims, 3 Drawing Sheets

(52) U.S. Cl.
CPC ...... *F01N 2610/02* (2013.01); *F01N 2610/10* (2013.01); *F01N 2610/1406* (2013.01); *Y02T 10/24* (2013.01)

(56) References Cited

U.S. PATENT DOCUMENTS

| | | |
|---|---|---|
| 8,464,966 B2 | 6/2013 | Haeberer et al. |
| 8,680,437 B2 | 3/2014 | Starck |
| 9,127,583 B2 | 9/2015 | Hodgson et al. |
| 9,562,458 B2 | 2/2017 | Amtmann et al. |
| 2006/0169055 A1* | 8/2006 | Agam .................. B65D 90/48 73/861.23 |
| 2010/0220984 A1 | 9/2010 | Potier et al. |
| 2012/0225396 A1 | 9/2012 | Harr et al. |
| 2016/0195300 A1 | 7/2016 | Potier et al. |

FOREIGN PATENT DOCUMENTS

| | | | |
|---|---|---|---|
| CN | 102667084 A | 9/2012 | |
| DE | 102005037201 A1 | 2/2007 | |
| DE | 102006061736 A1 | 7/2008 | |
| DE | 102008005196 A1 | 7/2009 | |
| DE | 102008045958 A1 | 3/2010 | |
| DE | 102009002120 A1 | 10/2010 | |
| DE | 102009041938 A1 | 3/2011 | |
| DE | 102009046954 A1 | 5/2011 | |
| DE | 102010030490 A1 | 12/2011 | |
| DE | 102011006105 A1 | 9/2012 | |
| EP | 2400125 * | 12/2011 | ........... F01N 3/2066 |
| EP | 2400125 A1 | 12/2011 | |
| KR | 20100024937 A | 3/2010 | |
| WO | 2010112254 A1 | 10/2010 | |
| WO | 2011085830 A1 | 7/2011 | |

\* cited by examiner

DEVICE FOR PROVIDING A LIQUID ADDITIVE

BACKGROUND OF THE INVENTION

Field of the Invention

The invention relates to a device for providing a liquid additive, in particular for providing a urea-water solution for an exhaust system. Such a device may be utilized for example to supply a liquid additive to an exhaust-gas treatment device of a motor vehicle.

In the automotive field, use is also made of exhaust-gas treatment devices in which pollutants of the exhaust gas are reduced with the aid of a reducing agent. An exhaust-gas purification process performed in this context is the method of selective catalytic reduction (SCR) in which nitrogen oxide compounds in the exhaust gas are reduced with the aid of ammonia to form non-harmful substances such as water, nitrogen and carbon dioxide. A reducing agent which can be converted to form ammonia may be supplied to the exhaust-gas treatment device in the form of liquid additive. The conversion to form ammonia then takes place thermally and/or hydrolytically (with the aid of a hydrolysis catalytic converter) in the exhaust gas. A urea-water solution is often used as a liquid additive for this purpose. A urea-water solution for exhaust-gas purification is available under the trade name AdBlue®.

A device for providing a liquid additive for a motor vehicle should be as inexpensive as possible. A problem of such a device is that the additives (such as for example the urea-water solution) can freeze at low temperatures. AdBlue® freezes for example at −11° C. In motor vehicles, such low temperatures may arise in particular during long standstill phases in winter. To nevertheless permit operation of the device, it is known to provide heaters by means of which the device can be heated. Frozen liquid additive in the device can be melted by means of the heaters. By means of the heaters, it is if appropriate also possible to prevent the freezing of the liquid additive. Such heaters should likewise be as inexpensive as possible and arranged within the device such that the heat produced by the heater is distributed as effectively as possible within the device. Furthermore, it should be ensured that the heater is exchangeable for maintenance purposes.

It must furthermore be taken into consideration that the electrical components provided in the device are to be operated continuously, wherein the aggressive environment (urea-water solution and/or roadway and/or weather conditions) places particular demands on attaining an arrangement which is inexpensive and easy to maintain.

BRIEF SUMMARY OF THE INVENTION

Taking this as a starting point, it is an object of the present invention to solve, or at least reduce, the technical problems discussed. It is sought in particular to provide a particularly inexpensive device for providing a liquid additive having a heater, in which the heater is simple to exchange and easy to maintain.

Said objects are achieved by means of a device according to the features recited below. Further advantageous refinements of the device are specified in the dependent claims. The features specified individually in the claims may be combined with one another in any desired technologically meaningful way and may be supplemented by explanatory facts from the description, with further embodiments of the invention being specified.

The invention relates to a device for providing a liquid additive, having an assembly main body on which is mounted at least one hydraulic component for the operation of the device, and having a plug-in plate which is fastened to the assembly main body and on which are mounted at least one electric heater and at least one further electrical component for the operation of the device, wherein the at least one electric heater extends from the plug-in plate into at least one cutout of the assembly main body.

A device for providing a liquid additive preferably comprises a pump by means of which the liquid additive can be delivered from a tank to a feed device. The liquid additive can be fed to an exhaust-gas treatment device by means of the feed device. From a suction point at the tank, through the pump, and to the feed device, there is preferably a delivery path which is formed by a line and through which the liquid additive is delivered. A device for providing a liquid additive may additionally have at least one valve and/or at least one sensor by means of which the delivery of the liquid additive can be controlled and/or monitored. The pump, valves which may be provided and sensors which may be provided are referred to here as hydraulic components of the device. Said hydraulic components (which interact (directly) with the additive) may be mounted on the assembly main body of the device.

The assembly main body may for example be in the form of a plate on which mounting positions for the hydraulic components are provided. The assembly main body may also have ducts which produce hydraulic connections between the individual hydraulic components. Said ducts in the assembly main body then form portions of the delivery path or of the delivery duct from the tank to the feed device.

The hydraulic components on the assembly main body generally also have at least one electrical terminal. A pump has for example a power supply terminal by means of which an electrical current can be supplied to the pump for the operation thereof. Sensors have electrical lines via which the sensors can output voltage pulses which correspond to measurement values measured by the sensors. Valves have electrical terminals for valve control. All of the electrical terminals of hydraulic components on the assembly main body are preferably combined in one electrical plug connector.

In addition to the assembly main body, the device has a plug-in plate. The plug-in plate bears electrical (or electronic) components of the device. Electrical components are for example electrical circuits, control units or similar components. Said electrical components control the operation of the hydraulic components on the assembly main body. It is preferable for all of the electrical components in the device to be mounted on the plug-in plate. The electrical components on the plug-in plate preferably have (in the same way as the hydraulic components on the assembly main body) electrical terminals. The electrical terminals of the electrical components on the assembly main body are preferably combined in one plug connector.

The electrical plug connector on the assembly main body and the electrical plug connector on the plug-in plate preferably engage into one another when the plug-in plate is fastened to the assembly main body. A plug connection is thus formed from the two plug connectors. The electrical plug connectors thus form a common electrical interface between the assembly main body and the plug-in plate. There is preferably a strict separation of hydraulic components on the assembly main body and electrical components on the plug-in plate. This allows the assembly main body with the hydraulic components and the plug-in plate with the electrical components to be produced and/or assembled separately from one another. This permits particularly simple and efficient production.

The electric heater of the device is an electrical component and is therefore fastened to the plug-in plate. The electric heater need not be in direct contact with the liquid additive in order to be able to perform its function in the device. The electric heater is therefore not a hydraulic component here. The electric heater however exhibits particularly good heat transfer to the liquid additive in the hydraulic components on the assembly main body. A cutout is therefore arranged in the assembly main body, into which cutout the electric heater extends proceeding from the plug-in plate. The cutout may be for example a bore in the assembly main body, and the electric heater may have at least one rod-shaped portion which extends into said bore.

As a result of the electric heater extending into a cutout of the assembly main body in this way, the electric heater can be arranged spatially particularly close to the assembly main body and close to the hydraulic components on the assembly main body. Heat-conducting elements may also be provided in the assembly main body in the region of the cutout, which heat-conducting elements permit a directed transfer of heat from the electric heater into the assembly main body. Such heat-conducting elements may be formed for example by contact regions which make contact with the electric heater when the electric heater extends into the cutout.

The device is particularly advantageous if the heater has an active heating portion and a passive heat-distributing portion, wherein heat is produced in the active heating portion, which heat is distributed by the passive heat-distributing portion, wherein the passive heat-distributing portion extends into the cutout of the assembly main body and the active heating portion is arranged on the plug-in plate so as to be spaced apart from the assembly main body.

Such a division of the heater makes it possible to use a smaller active heating portion in relation to conventional heaters. In this way, expensive actively heatable material can be prevented and replaced with more inexpensive heat-distributing material. Furthermore, electrical lines for the supply of power to the active heating portion can be kept shorter because the active heating portion can be located on the plug-in plate close to a power supply. Short electrical lines for the heater are particularly advantageous because, in motor vehicles, the heater is typically operated with low operating voltages, and electrical lines with a relatively large cross section are required for transmitting relatively large amounts of heat energy at low operating voltages. Such electrical lines are firstly expensive and secondly have a high weight.

The invention is furthermore advantageous if the passive heat-distributing portion comprises at least one heat pipe. In a heat pipe there is situated a cavity which is closed off in a gas-tight fashion and in which a fluid is present partially in the liquid phase and partially in the gaseous phase. Through evaporation and condensation, heat can be transmitted in a particularly effective manner by means of a heat pipe, without large temperature differences being required for this purpose. The use of a heat pipe in a described device is therefore particularly advantageous.

The device is furthermore advantageous if the plug-in plate has at least one guide by means of which the plug-in plate, during assembly with the assembly main body, is positioned spatially with respect to the assembly main body, wherein the guide is formed by the heater.

Such guides may be formed for example by rod-shaped structures or guide means which engage into corresponding openings on the assembly main body. Said engagement is preferably produced already during the assembly process when the plug-in plate is still spaced apart from the assembly main body. The plug-in plate can then be moved toward the assembly main body along the guides, such that all of the terminals on the assembly main body and on the plug-in plate are situated in the correct spatial position with respect to one another and are guided into one another.

Such guides project, for functional reasons, from the plug-in plate into corresponding cutouts on the assembly main body. It is therefore particularly advantageous and inexpensive to combine a heater with guides of said type. Additional components can thus be avoided. The heater and the described guides thus exhibit a surprisingly advantageous synergetic effect here.

The device is furthermore advantageous if, on the at least one guide there is formed at least one clamp means by which the plug-in plate is clamped against the assembly main body.

Such a clamp means may be formed for example by a barbed hook which hooks into the cutout on the assembly main body when the guide, or the guide, which is in the form of a heater, in the cutout, has reached its final position. With such a clamp means, it is possible for a firm and secure connection between the assembly main body and the plug-in plate to be produced in a simple manner, without additional assembly means such as for example screws or connecting pins being required for this purpose. The clamp means may additionally be designed for transferring heat between the heater and the assembly main body. As a result of the catching of the clamp means on the assembly main body, particularly intensive contact is generated between the guide and the assembly main body, which contact can be utilized for heat transfer.

The device is furthermore advantageous if the electric heater forms a direct contact with the assembly main body in the cutout, whereby the assembly main body comprises a heat transfer section inside the cutout which has direct contact to the electric heater so that heat is transferred from the heater to the assembly main body at least by means of thermal conduction.

The heat transfer section can be the surface of the assembly main body in the region of the cutout. Preferably, the heater fits exactly into the cutout. The surface of the assembly main body inside the cutout may by coated with heat conducting coating which promotes the heat transfer from the heater to the assembly main body. This coating can be a heat transfer paste.

The device is furthermore advantageous if the heat transfer section is flexible and can at least partially be compressed by means of the electric heater inside the cutout so that the heat transfer section is pressed against the electric heater.

The elastic heat transfer section can comprise at least one of the following materials:
  silicone rubber,
  glimmer,
  plastic foil, and
  paraffin wax.

In a further embodiment of the device heat is transferred from the electric heater to the assembly main body at least by means of thermal radiation or convection. Therefore, there is in particular an (air) gap between the assembly main body and the heater in the region of the cutout. The transfer of heat from the heater to the assembly main body by means of thermal radiation or by means of convection makes it possible for the heat transfer from the heater to the assembly main body to be precisely set. Owing to production tolerances, uniform direct contact between the heater and the assembly main body may be more difficult to produce than a consistent spacing between the heater and the assembly main body. It is thus possible by means of such a design to attain particularly uniform production of different devices. The surfaces of the heater and the surfaces of the assembly main body in the region of the cutout may be designed and formed such that a particularly effective transfer of heat by means of thermal radiation or by means of convection is possible. The main body may also comprise channels or other structures or devices which support the circulation of air which is in contact with the electric heater. For example, the assembly main body can comprise a closed and endless channel which permits a circulation of air. The heater as well as at least one hydraulic component are affected by this channel so that the heat which is emitted by the heater can be transported by the air from the heater to the hydraulic components.

The device is furthermore advantageous if the plug-in plate has at least one spring portion by means of which the assembly main body is braced in an outer housing.

An outer housing forms for example a (dry) chamber on a tank for the liquid additive. An outer housing may be metallic and/or produced from plastic. The outer housing may also be welded to the tank or to the tank wall of the tank. By means of the spring portion on the plug-in plate, the assembly main body is pressed preferably against a wall of the outer housing. This yields a particularly easy-to-produce fixing of the assembly main body in the outer housing. The assembly of the device can therefore be simplified by means of a spring portion.

The device is furthermore advantageous if an ultrasound sensor is fastened to the plug-in plate, by means of which ultrasound sensor at least one of the following parameters can be monitored:

the fill level of liquid additive in a tank, or a quality of the liquid additive in the tank.

In case the liquid additive is an urea water solution, the quality of the liquid additive is usually a concentration of urea. In a particularly preferred embodiment of the invention the ultrasonic sensor is configured to monitor both, a fill level and a quality of the liquid additive in the tank. The ultrasound sensor can measure the fill level in the tank by means of a measurement of the propagation of ultrasound waves through the liquid additive in the tank. The ultrasound sensor can perform the measurement through a housing, and therefore need not be in direct contact with the liquid additive. Here, the ultrasound sensor is an electrical component rather than a hydraulic component. The ultrasound sensor is preferably fastened to the plug-in plate such that the ultrasound sensor abuts against a housing of the device when the plug-in plate is mounted on the assembly main body. A spring portion of the plug-in plate can support this abutment. The liquid additive in the tank is situated on the other side of the outer housing, opposite the ultrasound sensor.

The invention can be used in particular in a motor vehicle having an internal combustion engine and having an exhaust-gas treatment device for the purification of the exhaust gases of the internal combustion engine and also having a described device by means of which a liquid additive can be provided to the exhaust-gas treatment device.

In the exhaust-gas treatment device there is preferably arranged an SCR catalytic converter by means of which the exhaust gas of the internal combustion engine can be purified with the aid of the liquid additive (reducing agent such as urea-water solution).

BRIEF DESCRIPTION OF THE SEVERAL VIEWS OF THE DRAWING

The invention and the technical field will be explained in more detail below on the basis of the figures. The figures show particularly preferred design variants, to which the invention is however not restricted. It is pointed out in particular that the figures, and in particular the illustrated dimensional relationships, are merely schematic. In the figures.

Identical components in the figures were denoted by the same reference numerals. The different design variants of a device 1 illustrated in FIGS. 1 to 5 shall therefore firstly be explained jointly.

DESCRIPTION OF THE INVENTION

Figure 1:
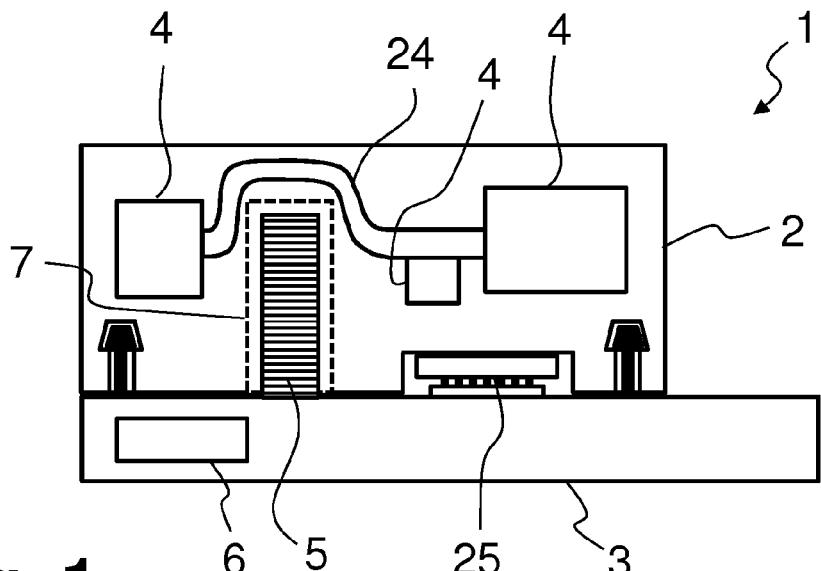
FIG. 1: shows a first design variant of a described device in the assembled state.

The device 1 has in each case an assembly main body 2 on which is arranged at least one hydraulic component 4 for delivering liquid additive (such as urea-water solution). Such hydraulic components 4 may be for example a pump, sensors and/or valves. The hydraulic components 4 are connected to one another on the assembly main body 2 via a delivery duct 24 through which a delivery of liquid additive takes place. The assembly main body 2 has a cutout 7. A plug-in plate 3 is fastened to the assembly main body 2. An electrical component 6 and the heater 5 are mounted on the plug-in plate 3. The plug-in plate 3 and the assembly main body 2 each have plug connectors 26 which, in the assembled state (as per FIG. 1), form a plug connection 25 via which the hydraulic components 4 on the assembly main body 2 and the electrical components 6 on the plug-in plate 3 are electrically connected to one another.

Figure 2:
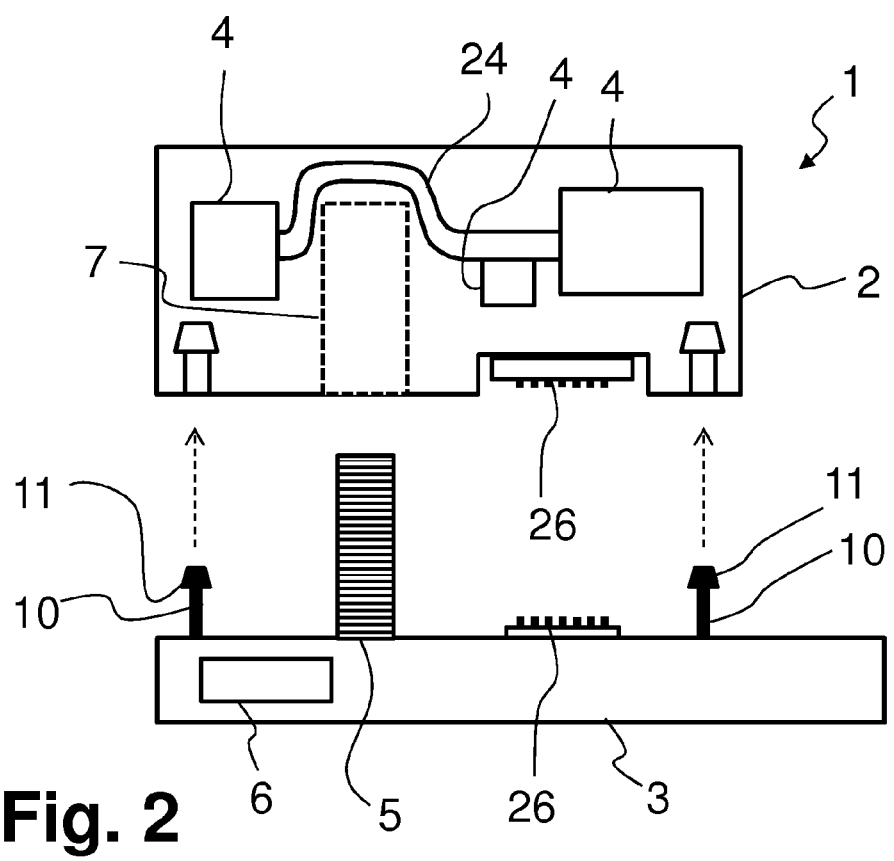
FIG. 2: shows the first design variant of the described device before assembly.

FIG. 2 illustrates the design variant of the device 1 from FIG. 1, before the plug-in plate 3 has been mounted on the assembly main body 2. Here, the plug connectors 26 on the assembly main body 2 and on the plug-in plate 3 are separate from one another. The heater 5 is not yet arranged within the cutout 7 of the assembly main body 2. The plug-in plate 3 has guides 10 which permit particularly simple mounting of the plug-in plate 3 on the assembly main body 2 in that said guides 10 position the plug-in plate 3 relative to the assembly main body 2 already before the plug-in plate is mounted on the assembly main body. The guides 10 have optional clamp means 11 by means of which the plug-in plate 3 can be clamped to the assembly main body 2.

Figure 3:
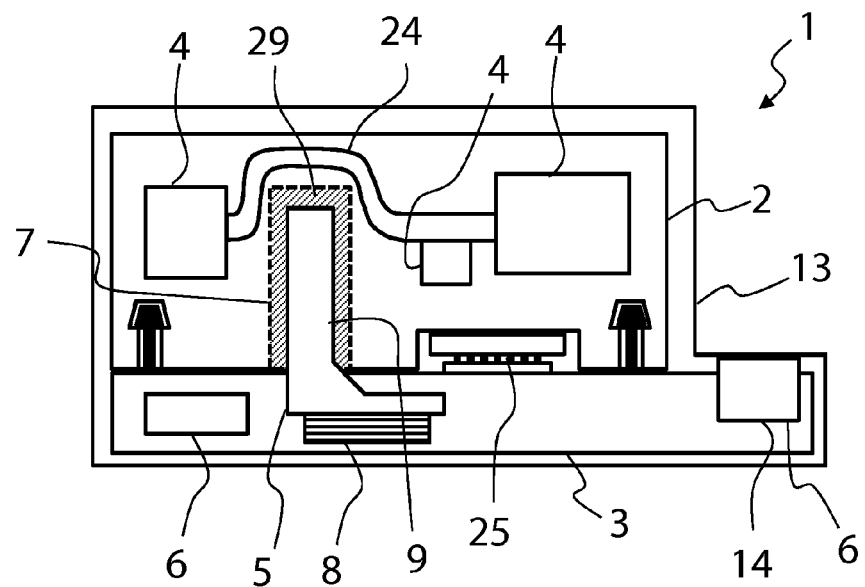
FIG. 3: shows a second design variant of a described device.

In the design variant of the device 1 illustrated in FIG. 3, the electric heater 5 is divided into an active heating portion 8 and a passive heat-distributing portion 9. In the design variant as per FIG. 3, an ultrasound sensor 14 is additionally arranged on the plug-in plate 3, by means of which ultrasound sensor a fill level in a tank for liquid additive can be monitored. Said ultrasound sensor 14 is an electrical component 6. The design variant of FIG. 3 is arranged in a housing 13. The ultrasound sensor 14 abuts against the housing 13 in order to be able to perform an ultrasound measurement of the fill level in a tank through the housing 13, wherein the housing 13 is for this purpose inserted into the tank base of said tank.

Figure 4:
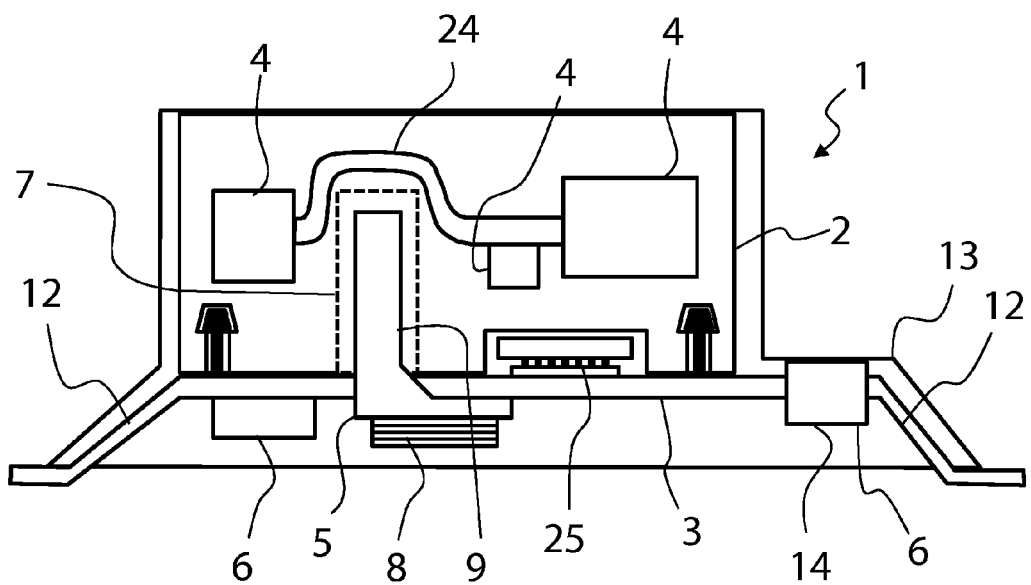
FIG. 4: shows a third design variant of a described device.

The design variant of the device as per FIG. 4 corresponds substantially to the design variant as per FIG. 3. Here, however, the plug-in plate 3 additionally has spring portions 12 which allow the assembly main body 2 to be braced in the housing 13. For this purpose, the spring portions 12 of the plug-in plate 3 press the assembly main body 2 in portions against the housing 13. As an example FIG. 4, shows a heat transfer section 29 which is part of the assembly main body 2 and which is in direct contact with the heater 5 to enable transfer of heat from the heater 5 to the assembly main body 2 by thermal conduction.

Figure 5:
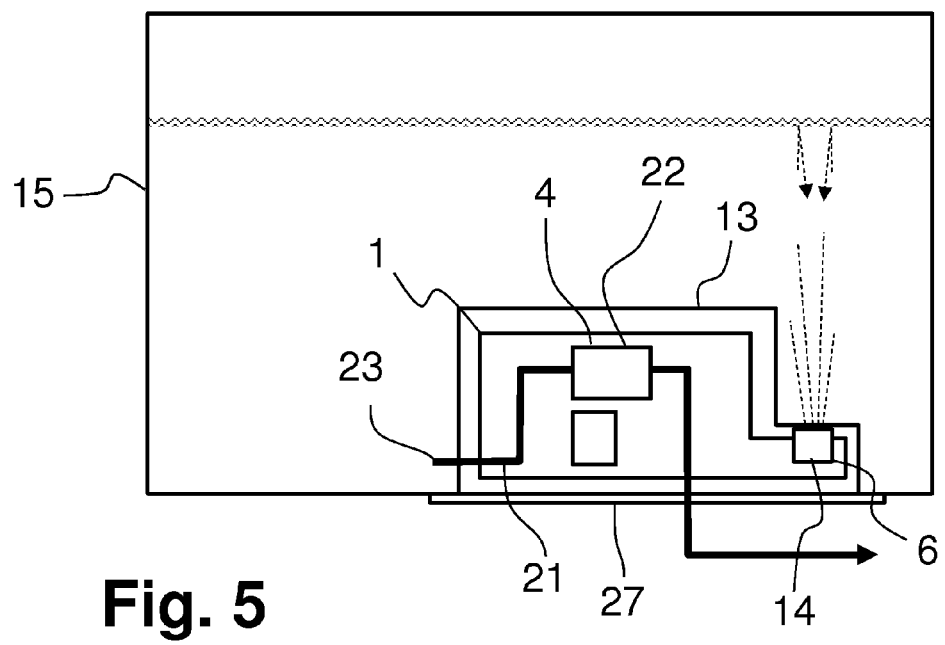
FIG. 5: shows a tank for liquid additive having a described device.

FIG. 5 illustrates a device 1 in a tank 15 for liquid additive. The housing 13 of the device 1 forms a separate chamber within the tank 15. The separate chamber may be formed for example as an inwardly protruding portion of the tank wall of the tank 15, which extends into the interior of the tank. Said inwardly protruding portion can be closed off from an outer side of the tank 15 by means of a cover 27. On the housing 13 there is provided a suction point 23 at which liquid additive can be extracted from the tank 15. A delivery path 21 extends out of the device 1 from the suction point 23. The delivery path 21 runs through a pump 22 by means of which the liquid additive can be delivered along the delivery path 21. The pump 22 is a hydraulic component 4 and is accordingly mounted on the assembly main body, which is not illustrated separately in FIG. 5. FIG. 5 also illustrates how the ultrasound sensor 14 measures the fill level of liquid additive in the tank 15. The ultrasound sensor is an electrical component 6, and is accordingly mounted on the plug-in plate 3, which is not illustrated separately in FIG. 5.

Figure 6:
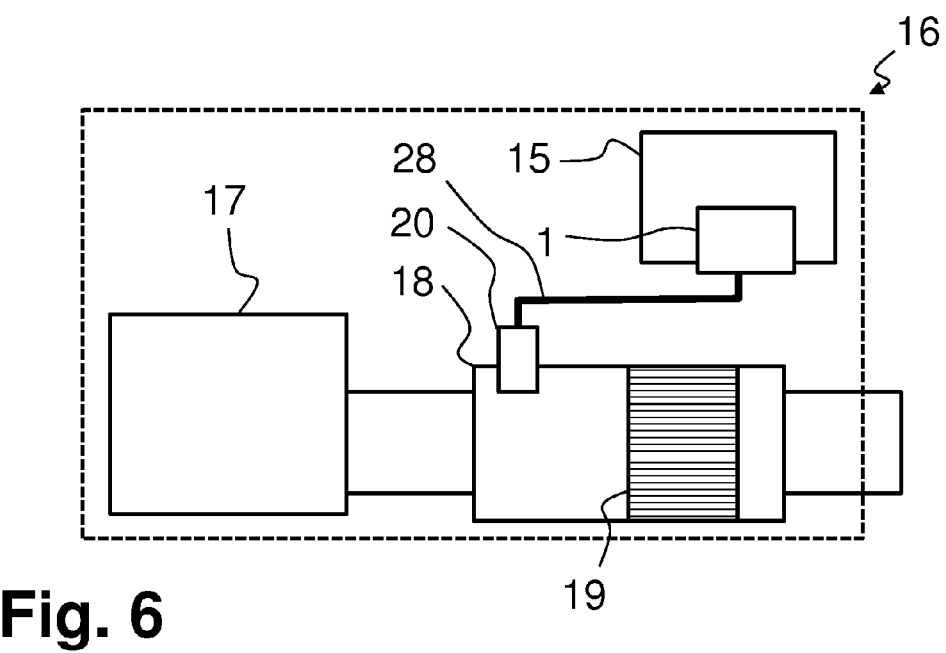
FIG. 6: shows a motor vehicle having a described device.

FIG. 6 shows a motor vehicle 16 having an internal combustion engine 17. The motor vehicle 16 also has an exhaust-gas treatment device 18 by means of which the exhaust gases of the internal combustion engine 17 can be purified. Liquid additive can be fed to the exhaust-gas treatment device by means of a feed device 20. Liquid additive is supplied from a tank 15 to the feed device 20 via a line 28 by a device 1. In the exhaust-gas treatment device 18 there is arranged an SCR catalytic converter 19 by means of which the nitrogen oxide compounds in the exhaust gas of the internal combustion engine 17 can be reduced with the aid of the liquid additive.

Even though numerous technical features have been illustrated in combination with one another in the figures, it is clear to a person skilled in the art that said technical features may also be extracted and combined with other exemplary embodiments. This should likewise apply where no explicit reference has been made to an imperative combination. This relates in particular to the number/arrangement/alignment of the components of the device, which may be interchanged here as desired.

The described device is particularly inexpensive and is particularly simple to assemble. At the same time, it permits particularly easy exchange and servicing of components, such that a repair of the device is particularly easily possible.

LIST OF REFERENCE NUMERALS

1 Device
2 Assembly main body
3 Plug-in plate
4 Hydraulic component
5 Heater
6 Electrical component
7 Cutout
8 Active heating portion
9 Passive heat-distributing portion
10 Guide
11 Clamp means
12 Spring portion
13 Housing
14 Ultrasound sensor
15 Tank
16 Motor vehicle
17 Internal combustion engine
18 Exhaust-gas treatment device
19 SCR catalytic converter
20 Feed device
21 Delivery path
22 Pump
23 Suction point
24 Delivery duct
25 Electrical plug connection
26 Plug connector
27 Cover
28 Line
29 Heat transfer section

The invention claimed is:

1. A device for providing a liquid additive, the device comprising:
   a tank for the liquid additive;
   an assembly main body disposed in said tank, said assembly main body having a cutout formed therein;
   at least one hydraulic component mounted at said assembly main body for operation of the device;
   a plug-in plate fastened to said assembly main body; and
   at least one electric heater and at least one further electrical component mounted at said plug-in plate for operation of the device;
   said at least one electric heater extending from said plug-in plate and disposed within said cutout.

2. The device according to claim 1, wherein:
   said at least one heater has an active heating portion and a passive heat-distributing portion;
   said active heating portion produces heat and said passive heat-distributing portion distributes heat;
   said passive heat-distributing portion extends into said cutout formed in said assembly main body; and
   said active heating portion is disposed on said plug-in plate and is spaced apart from said assembly main body.

3. The device according to claim 1, wherein said plug-in plate has at least one guide spatially positioning said plug-in plate relative to said assembly main body during assembly of said plug-in plate with said assembly main body, and said at least one guide is formed by said at least one heater.

4. The device according to claim 3, which further comprises at least one clamp formed on said at least one guide, said at least one clamp clamping said plug-in plate against said assembly main body.

5. The device according to claim 1, wherein:
   said at least one heater directly contacts said assembly main body in said cutout; and
   said assembly main body includes a heat transfer section disposed inside said cutout and directly contacting said at least one heater for transferring heat from said at least one heater to said assembly main body at least by thermal conduction.

6. The device according to claim 5, wherein said heat transfer section is flexible and can be at least partially compressed by said at least one heater inside said cutout causing said heat transfer section to be pressed against said at least one heater.

7. The device according to claim 1, which further comprises:
an outer housing;
said plug-in plate having at least one spring portion bracing said assembly main body in said outer housing.

8. The device according to claim 1, which further comprises an ultrasound sensor fastened to said plug-in plate, said ultrasound sensor being configured to monitor a fill level of liquid additive in said tank.

9. A motor vehicle, comprising:
an internal combustion engine;
an exhaust-gas treatment device for purifying exhaust gases of said internal combustion engine; and
a device according to claim 1 for providing a liquid additive to said exhaust-gas treatment device.

10. A device for providing a liquid additive, the device comprising:
an assembly main body disposed in a tank for the liquid additive;
at least one hydraulic component mounted at said assembly main body for operation of the device;
a plug-in plate fastened to said assembly main body; and
at least one electric heater and at least one further electrical component mounted at said plug-in plate for operation of the device;
said at least one electric heater extending from said plug-in plate into at least one cutout formed in said assembly main body, said at least one heater having an active heating portion and a passive heat-distributing portion said passive heat-distributing portion including at least one heat pipe;
said active heating portion producing heat and said passive heat-distributing portion distributing heat;
said passive heat-distributing portion extending into said at least one cutout formed in said assembly main body; and
said active heating portion being disposed on said plug-in plate and spaced apart from said assembly main body.

11. A device for providing a liquid additive, the device comprising:
an assembly main body disposed in a tank for the liquid additive;
at least one hydraulic component mounted at said assembly main body for operation of the device;
a plug-in plate fastened to said assembly main body; and
at least one electric heater and at least one further electrical component mounted at said plug-in plate for operation of the device;
said at least one electric heater extending from said plug-in plate into at least one cutout formed in said assembly main body;
said plug-in plate and said assembly main body each having respective plug connectors defining a plug connection in an assembled state of said plugin plate and said assembly main body.

12. The device according to claim 11, wherein said plug connection electrically connects said further electrical component to said at least one hydraulic component.

* * * * *